Figure 1:
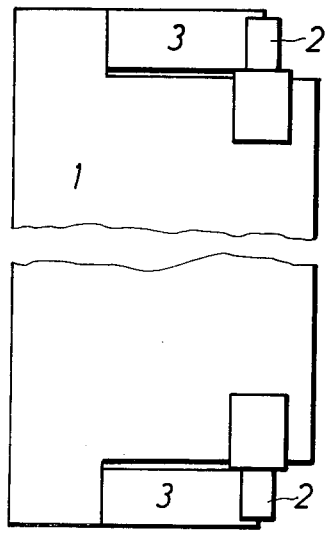

Nov. 9, 1965    W. STRITTMATTER    3,216,042
WIPER BLADES FOR THIN LAYER EVAPORATORS
Filed Oct. 1, 1963

INVENTOR.
WERNER STRITTMATTER
BY
Burgess, Dinklage & Sprung
ATTORNEYS

United States Patent Office 3,216,042
Patented Nov. 9, 1965

3,216,042
WIPER BLADES FOR THIN LAYER EVAPORATORS
Werner Strittmatter, Butzbach, Hessen, Germany, assignor to Farbenfabriken Bayer Aktiengesellschaft, Leverkusen, Germany, a corporation of Germany
Filed Oct. 1, 1963, Ser. No. 312,991
Claims priority, application Germany, Oct. 10, 1962, (utility model) F 22,793
3 Claims. (Cl. 15—246.5)

The invention concerns wiper blades for thin layer evaporators, which are straight or angular and which are arranged in such a way between supports fixed stepwise above one another to the stirrer that they are swingable about pivot spindles mounted in bores in the supports.

When the stirring mechanism is rotated, the movable wiper blades are swung outwards about their pivot spindles due to the centrifugal force so that their outer edges slide against the cylindrical wall of the evaporator. In order to avoid friction and abrasion of the outer edges of the wiper blades against the wall after the blades have been set in motion, the wiper blades are provided, according to the invention, with stops which are situated near the pivot spindles and which bear against the support when they are in the operating position. The stops may be in the form of flaps formed by bending the ends of the blade away from the plane of the blade. Alternatively, they may be formed by the edges produced in angular blades by incisions at the ends of the blade near the pivot spindle.

Construction examples of the invention are shown diagrammatically in the drawing.

Figure 2:
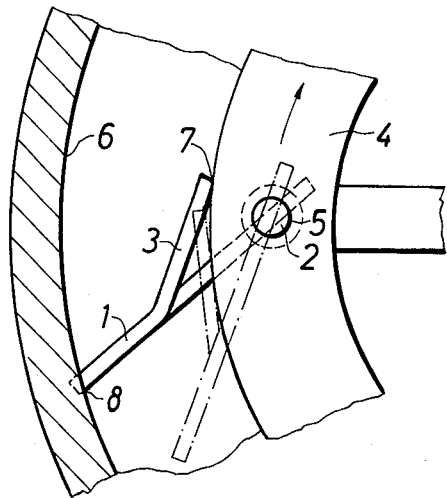
Figure 3:
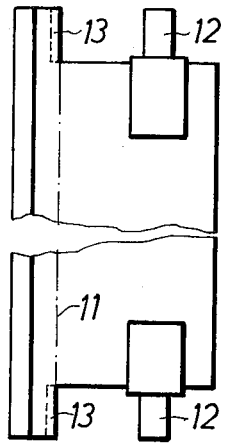
Figure 4:
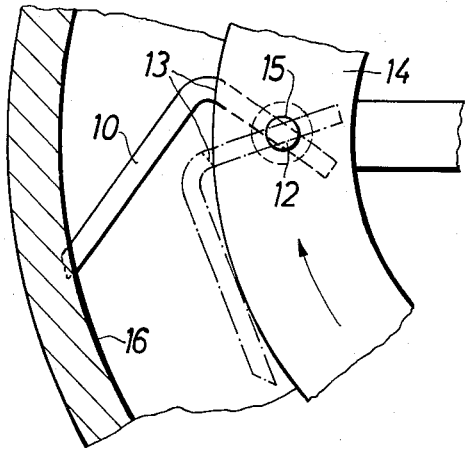

FIG. 1 is a side view of a straight wiper blade provided with flaps that can be bent out of it. FIG. 2 shows the means whereby the wiper blade is fixed to the rotatable support inside the evaporator cylinder. FIG. 3 is a side view of an angular wiper blade in which the ends of the blade are cut out near the pivot spindle. FIG. 4 shows the mounting of the angular wiper blade in the support.

In FIGS. 1 and 2, the reference numeral 1 indicates the straight wiper blade, 2 the pivot spindle, 3 the flaps which can be bent out of the plane of the blade, 4 the support in the form of a ring, 5 a bore in the supporting ring 4 into which bore the pivot spindle 2 of the blade is inserted, and 6 the inner wall of the evaporator cylinder. The wiper blade shown in dotted lines in FIG. 2 with the flaps 3 bent out of the plane of the blade, represents the position of the wiper at rest. When the ring 4 is rotated in the direction of the arrow, the blade is swung outwardly and the edge 7 of the flap 3 bears against the outer edge of the supporting ring 4. This prevents any further abrasion of the edge 8 of the wiper blade 1 once the blade has been run in. The wiper blade 10 according to FIG. 3 is bent along the line 11, as seen also in FIG. 4. In the region of the pivot spindles 12, the ends of the blades are cut out as far as the longitudinal line 11. The angular blades 10 are mounted by inserting the pivot spindle 12 situated at the end of the shorter arm of each blade in bores 15 in the supporting ring 14 (FIG. 4). The position of the angular blade when at rest is indicated in dotted lines. In the operating position, the edges 13 of the ends of the blade that project forward at the incision bear against the outer edge of the ring 14 and thus prevent any further abrasion of the edges of the blade against the wall 16 of the evaporator once the angular blades 10 have been run in.

I claim:
1. A wiper blade pivotally mounted to a rotatable support member for wiping the interior surface of an evaporator cylinder, which comprises:
   (a) a spindle journaled in said support member, and,
   (b) a blade fixedly secured to said spindle, said blade having a straight outer edge and a bent flap on at least one end, said blade being secured to the spindle so that its outer edge is swung into contiguous wiping contact with the cylinder surface by centrifugal force as the support member is rotated, said flap being bent away at an angle from the blade surface to form a stop which bears against said rotating support when the outer edge of the blade is in wiping contact with the cylinder surface thereby preventing said blade edge from being swung further into abrasive contact with said cylinder surface.
2. The wiper blade of claim 1 wherein two flaps are provided, one on each end of the blade, and said flaps are formed integrally with the blade.
3. A wiper blade pivotally mounted between a pair of axially spaced flanges on a rotatable support member for wiping the interior surface of an evaporator cylinder, which comprises:
   (a) a spindle disposed between said flanges, the ends of said spindle being journaled in respectively adjacent flanges of said support member; and,
   (b) a blade having a straight outer edge and an inner edge, said blade being bent along a line between said inner and outer edges and cut back at each end to form stop notches thereat which extend from the inner edge toward the bend line, with the portion of the blade between the inner edge and bend line being fixedly secured to said spindle whereby when the support member is rotated, the outer edge of the blade is swung into contiguous wiping contact with the cylinder surface, said notches acting as stops bearing against the flanges of the support member to prevent the blade edge from being swung further into abrasive contact with said cylinder surface.

References Cited by the Examiner
UNITED STATES PATENTS

| 969,016 | 8/10 | Willmann | 259—134 |
|---|---|---|---|
| 1,018,505 | 2/12 | Kronenberger | 259—51 |
| 2,974,725 | 3/61 | Samesreuther et al. | 159—6 |
| 3,030,993 | 4/62 | Schmook | 241—194 X |
| 3,087,708 | 4/63 | Sims. | |

FOREIGN PATENTS

| 1,068,219 | 11/59 | Germany. |
|---|---|---|
| 1,114,688 | 10/61 | Germany. |

CHARLES A. WILLMUTH, Primary Examiner.
WALTER A. SCHEEL, Examiner.